United States Patent
Ikui et al.

(10) Patent No.: US 11,203,266 B2
(45) Date of Patent: Dec. 21, 2021

(54) BATTERY STATION MANAGEMENT SYSTEM INCLUDING SERVER FOR GENERATING MONITORING SCREEN SHOWING STATE INFORMATION OF BATTERY EXCHANGE DEVICES AND BATTERY DEVICES IN EACH BATTERY STATION AND BATTERY STATION MANAGEMENT METHOD

(71) Applicants: HONDA MOTOR CO., LTD., Tokyo (JP); PANASONIC INTELLECTUAL PROPERTY MANAGEMENT CO., LTD., Osaka (JP)

(72) Inventors: Kuniaki Ikui, Saitama (JP); Toshiya Zaitsu, Tokyo (JP); Hiromitsu Ebisu, Tokyo (JP); Hiroki Shinohara, Kanagawa (JP); Masashi Takemura, Kanagawa (JP); Kenichiro Shibasaki, Kanagawa (JP); Koji Aoto, Kanagawa (JP); Yoshihiko Ishida, Kanagawa (JP)

(73) Assignees: HONDA MOTOR CO., LTD., Tokyo (JP); PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/971,532

(22) PCT Filed: Feb. 15, 2019

(86) PCT No.: PCT/JP2019/005669
§ 371 (c)(1),
(2) Date: Aug. 20, 2020

(87) PCT Pub. No.: WO2019/163681
PCT Pub. Date: Aug. 29, 2020

(65) Prior Publication Data
US 2020/0391602 A1 Dec. 17, 2020

(30) Foreign Application Priority Data
Feb. 23, 2018 (JP) .............................. JP2018-030741

(51) Int. Cl.
*B60L 53/00* (2019.01)
*B60L 53/30* (2019.01)
(Continued)

(52) U.S. Cl.
CPC .............. *B60L 53/305* (2019.02); *B60L 53/53* (2019.02); *B60L 53/62* (2019.02); *B60L 53/665* (2019.02);
(Continued)

(58) Field of Classification Search
CPC ........ B60L 53/305; B60L 53/53; B60L 53/62; B60L 53/80; B60L 53/665; G06Q 30/0202; G06Q 30/0639; H01M 10/48
See application file for complete search history.

(56) References Cited

U.S. PATENT DOCUMENTS 8,355,965 B2 * 1/2013 Yamada ................ H01M 10/48
705/30
8,798,852 B1 * 8/2014 Chen ...................... G06F 21/44
701/32.6

(Continued)

FOREIGN PATENT DOCUMENTS

| JP | 2000-164185 | 6/2000 |
|----|-------------|--------|
| JP | 2005-248646 | 9/2005 |

(Continued)

OTHER PUBLICATIONS

International Search Report (ISR) from International Searching Authority (Japan Patent Office) in International Pat. Appl. No. PCT/JP2019/005669, dated Mar. 26, 2019, along with an English language translation thereof.

*Primary Examiner* — Naum Levin
(74) *Attorney, Agent, or Firm* — Greenblum & Bernstein, P.L.C.

(57) ABSTRACT

The present application allows all battery stations located in different locations to be efficiently monitored, and management and maintenance operations to be performed in a timely fashion to keep the state of the battery stations in proper order. A server device collects state information on a state of a battery exchange device in each battery station, and on a state of each battery device received in the corresponding battery exchange device, and to generate a monitoring screen showing the state information of each (Continued)

battery station on an area map displayed on a management or maintenance terminal. In particular, a plurality of display sections displayed on the monitoring screen are arranged so as to correspond to the urgency or detail level of the state information. The state information is displayed in different colors according to different emergency levels.

14 Claims, 6 Drawing Sheets

(51) Int. Cl.
  *B60L 53/53* (2019.01)
  *B60L 53/62* (2019.01)
  *B60L 53/66* (2019.01)
  *H01M 10/48* (2006.01)
  *G06Q 30/06* (2012.01)
  *G06Q 30/02* (2012.01)
  *B60L 53/80* (2019.01)

(52) U.S. Cl.
  CPC .......... *B60L 53/80* (2019.02); *G06Q 30/0202* (2013.01); *G06Q 30/0639* (2013.01); *H01M 10/48* (2013.01)

(56) References Cited

U.S. PATENT DOCUMENTS

| | | | |
|---|---|---|---|
| 8,861,476 B2* | 10/2014 | Fujimoto | H04W 16/20 370/331 |
| 8,878,487 B2* | 11/2014 | Wu | B60L 58/16 320/108 |
| 8,996,308 B2* | 3/2015 | Wu | B60L 58/26 701/454 |
| 9,103,686 B2* | 8/2015 | Pettersson | B60L 58/12 |
| 9,552,682 B2* | 1/2017 | Luke | B60L 3/0046 |
| 10,600,116 B2 | 3/2020 | Takatsuka et al. | |
| 10,839,451 B2* | 11/2020 | Penilla | B60L 53/305 |
| 2009/0082957 A1* | 3/2009 | Agassi | B60L 53/67 701/532 |
| 2010/0094496 A1* | 4/2010 | Hershkovitz | B60L 3/12 701/22 |
| 2011/0218703 A1 | 9/2011 | Uchida | |
| 2012/0303397 A1* | 11/2012 | Prosser | B60L 53/00 705/7.12 |
| 2013/0030580 A1 | 1/2013 | Luke et al. | |
| 2015/0039391 A1* | 2/2015 | Hershkovitz | G06Q 50/30 705/7.31 |
| 2020/0384879 A1* | 12/2020 | Ebisu | B60L 53/80 |
| 2020/0402075 A1* | 12/2020 | Ebisu | B60L 53/80 |

FOREIGN PATENT DOCUMENTS

| | | |
|---|---|---|
| JP | 2010-111276 | 5/2010 |
| JP | 2014-525231 | 9/2014 |
| JP | 2017-020560 | 1/2017 |
| JP | 2017-091426 | 5/2017 |

* cited by examiner

BATTERY STATION MANAGEMENT SYSTEM INCLUDING SERVER FOR GENERATING MONITORING SCREEN SHOWING STATE INFORMATION OF BATTERY EXCHANGE DEVICES AND BATTERY DEVICES IN EACH BATTERY STATION AND BATTERY STATION MANAGEMENT METHOD

TECHNICAL FIELD

The present invention relates to a battery station management system and a battery station management method for managing a battery station in a battery exchange service whereby users of electric vehicles and other devices exchange battery devices at the battery station.

BACKGROUND ART

In recent years, electric vehicles such as electric motorcycles have attracted attention from the viewpoint of solving the problems of air pollution due to exhaust gas and high fuel costs. The cruising ranges of such electric vehicles are progressively extended owing to the improvement in the performance of the battery devices, but such electric vehicles are unable to operate for extended periods of time due to the inconvenience of requiring the battery devices to be recharged.

In order to eliminate such an inconvenience, battery exchange services have been conventionally known as a mean for allowing operation of electric vehicles fitted with detachable batteries for extended periods of time by allowing spent battery devices to be exchanged with fully recharged battery devices at battery stations (see Patent Documents 1 and 2).

PRIOR ART DOCUMENT(S)

Patent Document(s)

Patent Documents 1: JP2014-525231A
Patent Documents 2: JP2017-91426A

SUMMARY OF THE INVENTION

Task to be Accomplished by the Invention

In such a battery exchange service, it is important to place an adequate number of battery stations in order to improve user convenience. However, as the number of battery stations increases, it becomes more difficult to monitor the status of each battery station in an efficient manner so that the management and maintenance operations for keeping the battery stations in proper order may not be performed in a timely fashion. Therefore, there is a need for a technology that allows efficient monitoring of the status of each and every battery station.

However, the conventional technology provides no mechanism for efficiently monitoring the status of each and every battery station so that a management operation and a maintenance operation for keeping the state of each battery station in proper order cannot be performed in a timely fashion.

In view of such a problem of the prior art, a primary object of the present invention is to provide a battery station management system and a battery station management method that allow the management operation and the maintenance operation for keeping the status of each and every battery station to be performed in a prompt manner by monitoring all of the battery stations located in various locations in an efficient manner.

Means to Accomplish the Task

The present invention provides a battery station management system comprising a plurality of battery exchange devices each provided in a battery station to receive and recharge battery devices returned by users, and lend out recharged battery devices in exchange for returned battery devices, and a server device connected to the battery exchange devices via a network to manage a status of exchanging battery devices at each battery exchange device, wherein the server device is configured to collect state information on a state of the battery exchange device in each battery station, and on a state of each battery device received in the corresponding battery exchange device, and to generate a monitoring screen showing the state information of each battery station on an area map.

The present invention further provides a battery station management method for managing battery stations at which users exchange battery devices in a server device, the method comprising the steps of collecting state information on a state of the battery exchange device in each battery station, and on a state of each battery device received in the corresponding battery exchange device, and generating a monitoring screen showing the state information of each battery station on an area map.

Effect of the Invention

According to the present invention, an administrator or a maintenance person can monitor the state of each of a number of battery stations located in different locations in an efficient manner by viewing the monitoring screen so that the management operation and the maintenance operation for keeping the status of each and every battery station in proper order can be performed in a prompt manner.

DETAILED DESCRIPTION OF THE PREFERRED EMBODIMENT(S)

Figure 1:
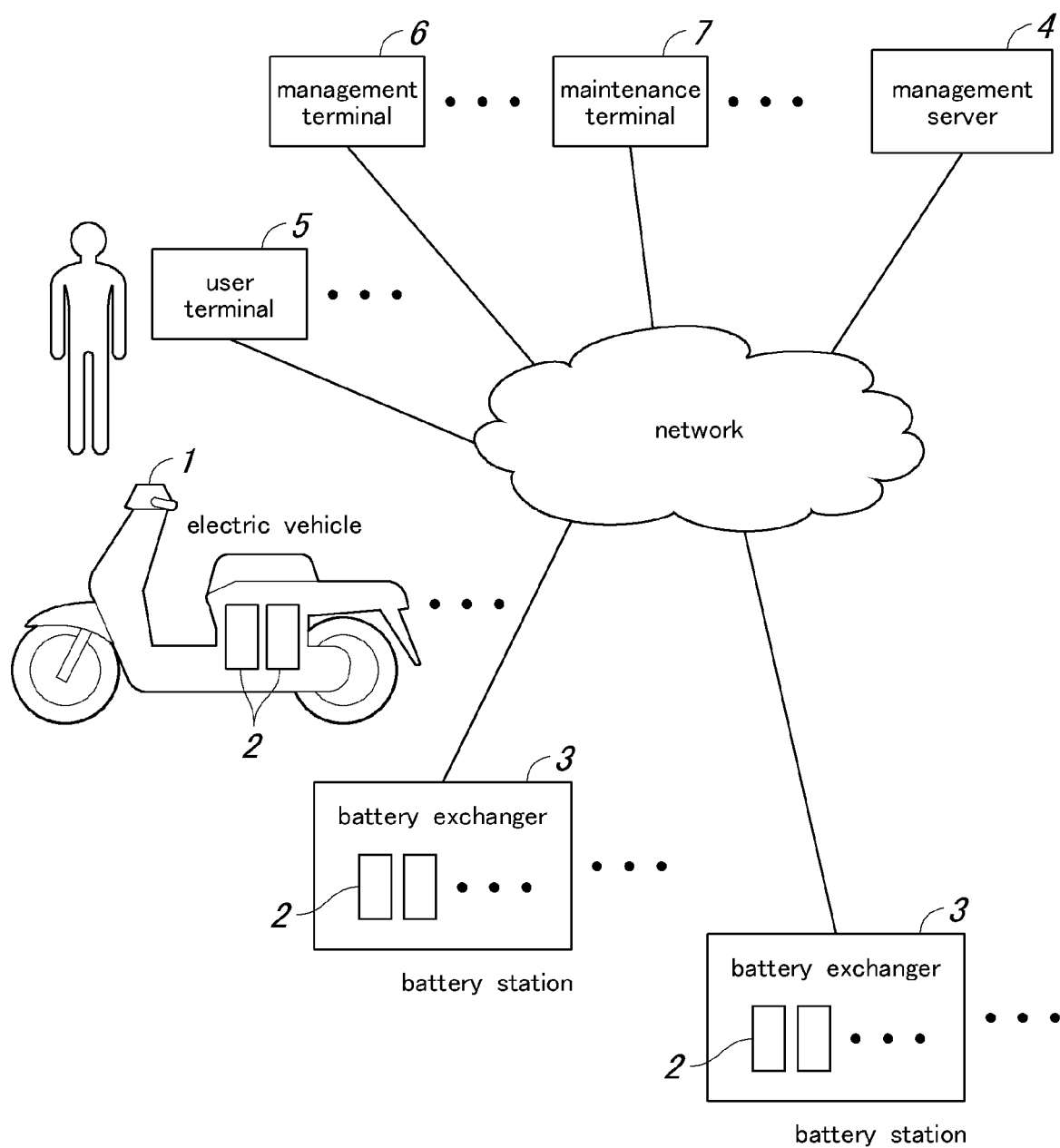
FIG. 1 is an overall schematic diagram of a battery sharing system according to an embodiment of the present invention.

To accomplish the foregoing task, a first aspect of the present invention provides a battery station management system comprising a plurality of battery exchange devices each provided in a battery station to receive and recharge battery devices returned by users, and lend out recharged battery devices in exchange for returned battery devices, and a server device connected to the battery exchange devices via a network to manage a status of exchanging battery devices at each battery exchange device, wherein the server device is configured to collect state information on a state of the battery exchange device in each battery station, and on a state of each battery device received in the corresponding battery exchange device, and to generate a monitoring screen showing the state information of each battery station on an area map.

Thus, an administrator or a maintenance person can monitor the state of each of a number of battery stations located in different locations in an efficient manner by viewing the monitoring screen so that the management operation and the maintenance operation for keeping the status of each and every battery station in proper order can be performed in a prompt manner.

According to a second aspect of the present invention, the server device is configured to arrange a plurality of display sections displaying the state information on the monitoring screen so as to correspond to an importance level or detail level of the state information.

Thereby, an administrator or a maintenance person can monitor the state of each of a number of battery stations in an even more efficient manner.

According to a third aspect of the present invention, the server device is configured to display the state information on the monitoring screen in colors corresponding to urgency levels of the state information.

Thereby, an administrator or a maintenance person can promptly determine the level of urgency at each battery station.

According to a fourth aspect of the present invention, the server device is configured to display a status of battery devices that are available for lending out at each battery station.

Thereby, an administrator or a maintenance person can determine the state of use of each battery station.

According to a fifth aspect of the present invention, the server device is configured to display a battery station list detailing the state information for each battery station on the monitoring screen, to display an icon at a position corresponding to each battery station on the area map displayed on the monitoring screen, and in response to an operator's operation on any of the icons, to highlight an entry of the corresponding battery station in the battery station list.

Thereby, an administrator or a maintenance person can determine the detailed information on the battery station designated by the icon.

A sixth aspect of the present invention provides a battery station management method for managing battery stations at which users exchange battery devices in a server device, the method comprising the steps of collecting state information on a state of the battery exchange device in each battery station, and on a state of each battery device received in the corresponding battery exchange device, and generating a monitoring screen showing the state information of each battery station on an area map.

Similarly as with the first aspect of the present invention, an administrator or a maintenance person can monitor the state of each of a number of battery stations located in different locations in an efficient manner so that the management operation and the maintenance operation for keeping the status of each and every battery station in proper order can be performed in a prompt manner.

An embodiment of the present invention is described in the following with reference to the appended drawings.

FIG. 1 is an overall schematic diagram of a battery sharing system according to an embodiment of the present invention.

This battery sharing system is configured to provide a service by which battery packs 2 (battery devices) used in electric vehicles 1 such as electric motorcycles can be shared among a plurality of users, and includes battery exchangers 3 (battery exchanging devices), a management server 4 (server device), user terminals 5 (terminal devices), a management terminal 6, and a maintenance terminal 7.

The battery exchangers 3, the management server 4, the user terminals 5, the management terminal 6, and the maintenance terminal 7 are connected to one another via a network such as the Internet. The battery exchangers 3 and the user terminals 5 are connected to the network via a wireless communication such as a mobile communication network and a wireless LAN.

Each electric vehicle 1 is fitted with a battery pack 2, and runs on the electric power of the battery pack 2. The electric vehicle consists of an electric motorcycle in the example shown in FIG. 1, but may also consist of a four-wheeled vehicle. It may be a mobility device not for public roads such as an electric wheelchair, an electric cart, or a riding cart for use in a theme park, a golf course or the like.

Each battery exchanger 3 receives and charges the battery packs 2 returned by the users, and lends out the charged battery packs 2 to the users in exchanged for the returned battery packs 2. The battery exchanger 3 is located in a battery station which may be attached to a facility (store) such as a convenience store and a gas station. Multiple battery exchangers 3 may be installed in one battery station.

The management server 4 manages the exchange status of the battery packs 2 in each battery exchanger 3. In addition, the management server 4 monitors the state of the battery exchangers 3 (if online or not) and the state of the battery packs 2 received in each battery exchanger 3 (if fully charged or not), and communicates the state information on the battery exchangers 3 and the battery packs 2 to the management terminal 6 and the maintenance terminal 7. Further, the management server 4 communicates information on the battery stations and the like to the user terminals 5.

Each user terminal 5 may consist of a smartphone, a tablet terminal, or the like, and is possessed by the user of the corresponding electric vehicle 1. The user terminal 5 displays a screen delivered from the management server 4, such as a screen for guiding the locations of the battery stations or a screen for making a reservation for a battery exchange.

The management terminal 6 is placed in a facility where the users receive services or a management center, and is operated by an administrator. The administrator registers users on the management terminal 6, and can view information provided by the management server 4 on the management terminal 6.

The maintenance terminal 7 is placed in a facility dedicated for maintenance operation or a facility such as a store provided with a battery station, and is operated by a maintenance person. The maintenance person can view information provided by the management server 4 on the maintenance terminal 7.

The battery packs 2 to be mounted on electric vehicles are given as an example in the present embodiment, but the battery mounted device in which the battery pack 2 is mounted is not limited to the electric vehicle. The battery packs 2 may also be for use on portable power supply devices, for example.

Figure 2:
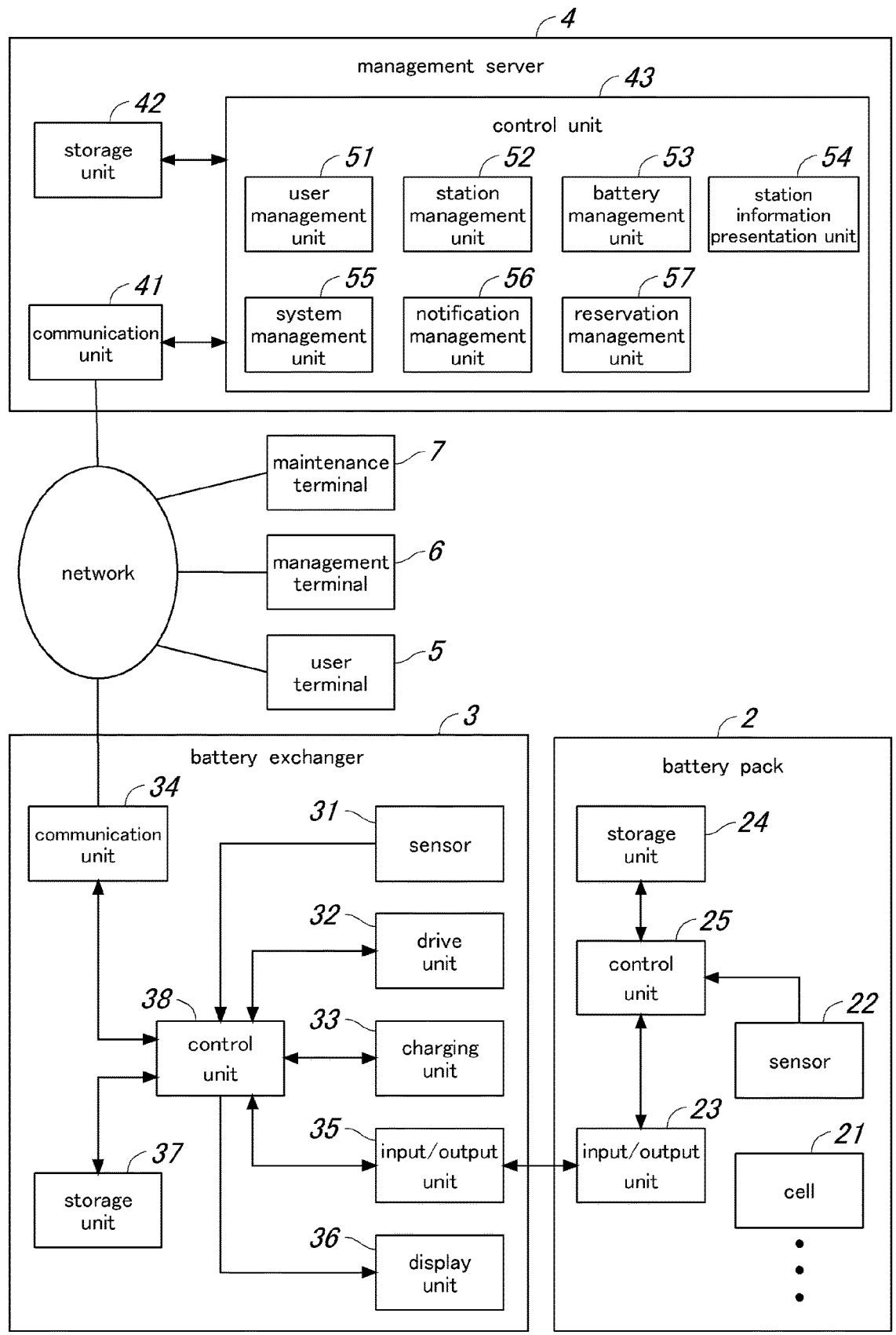
FIG. 2 is a block diagram showing overall structures of a battery pack 2, a battery exchanger 3 and a management server 4.

The overall structures of the battery pack 2, the battery exchanger 3, and the management server 4 are described in the following. FIG. 2 is a block diagram showing overall structures of the battery pack 2, the battery exchanger 3 and the management server 4.

The battery pack 2 includes battery cells 21, a sensor 22, an input/output unit 23, a storage unit 24, and a control unit 25.

The sensor 22 detects the voltage, current, temperature, etc. of the battery cells 21.

The input/output unit 23 forwards and receives information to and from the battery exchanger 3, and forwards serial numbers, alert events, deterioration information, etc. to the battery exchanger 3, for instance.

The storage unit 24 stores a program to be executed by a processor that forms the control unit 25. The storage unit 24 also stores serial numbers (individual identification information) and the like.

The control unit 25 includes a processor, and controls the various parts of the battery pack 2. For example, by receiving detection results from the sensor 22, the control unit 25 detects any abnormal condition and deterioration state of the battery cells 21, and forwards alert and deterioration information from the input/output unit 23.

The battery exchanger 3 includes a sensor 31, a drive unit 32, a charging unit 33, a communication unit 34, an input/output unit 35, a display unit 36, a storage unit 37, and a control unit 38.

The sensor 31 may consist of a human sensor, for instance, to detect a person who has visited the battery exchanger 3 for battery exchange.

User authentication may be performed to identify the user who has visited the battery exchanger 3 for battery exchange. In this case, the user may be identified by face recognition from the image captured by a camera. In addition, the user may be identified by communication with an RFID (radio frequency identifier) tag or a non-contact type IC card possessed by the user, or the user terminal 5 equipped with the NFC (Near Field Communication) function. Further, the user being about to return the battery pack 2 may be detected by reading a two-dimensional code affixed to the battery pack 2 from the image captured by a camera.

In response to an instruction from the control unit 38, the drive unit 32 drives the opening/closing mechanism of a door at the timing of returning and lending out the battery packs 2. The returned battery packs 2 are stored, and a dispensing mechanism is activated to release the battery packs 2 to be lent out to the users. Upon detecting a user by using the sensor 31, the control unit 38 initiates a battery exchange operation, and opens the door to receive a battery pack 2 from the user.

The charging unit 33 charges the battery pack 2 held in the corresponding slot (tray).

The communication unit 34 communicates with the management server 4 via the network.

The input/output unit 35 forwards and receives information to and from each battery pack 2, and receives the serial number of the battery pack 2, alerts, deterioration information, and the like from the battery pack 2.

The display unit 36 displays a guide screen for guiding the user in exchanging the battery packs 2.

The storage unit 37 stores a program to be executed by the processor that forms the control unit 38. The storage unit 37 also stores an in-use battery list regarding the battery packs 2 that are available for the battery exchange service, and a lending priority list that earmarks the battery packs 2 to be lent out by the battery exchanger 3, and determines the priority of the battery packs 2 to be lent out. The in-use battery list and the lending priority list are received from the management server 4.

The control unit 38 is formed by a processor, and controls various parts of the battery exchanger 3. For example, based on the in-service battery list, the control unit 38 determines if the returned battery pack 2 is a genuine product (or if the battery pack 2 is an object that is covered by the battery exchange service). Further, the control unit 38 commands the drive unit 32 to select the battery pack 2 to be lent out according to the lending priority list, and to dispense the selected battery pack 2 to the user. Further, a returned/lent list (including the serial numbers and the like) regarding the returned battery packs 2 and the lent out battery packs 2 is transmitted from the communication unit 34 to the management server 4.

The management server 4 includes a communication unit 41, a storage unit 42, and a control unit 43.

The communication unit 41 communicates with the battery exchangers 3, the user terminals 5, the management terminal 6, and the maintenance terminal 7 via the network.

The storage unit 42 stores the program executed by the processor forming the control unit 43. In addition, the storage unit 42 stores various pieces of management information such as user registration information, an in-service battery list regarding the battery packs 2 that are available for the battery exchange service, an excluded battery list regarding the battery packs 2 that are excluded from the battery exchange service, and linking information that indicates the relationship between the battery packs 2 and the users to whom the battery packs 2 are lent.

The control unit 43 includes a user management unit 51, a station management unit 52, a battery management unit 53, a station information presentation unit 54, a system management unit 55, a notification management unit 56, and a reservation management unit 57. The control unit 43 is formed by a processor, and the various components of the control unit 43 are realized by executing the program stored in the storage unit 42 by the processor.

The user management unit 51 manages the users who use the battery packs 2. For example, the administrator receives an application for new registration from a user, and registers the user information (such as a user ID, a name, an address, and the vehicle type of the electric vehicle used) (user registration).

The station management unit 52 manages the battery station and the battery exchanger 3 placed in the battery station. For example, when a battery pack 2 is exchanged for another by the battery exchanger 3, the lending priority list that defines the battery packs to be lent out, and the lending order are updated, and transmits the updated lending priority list to the battery exchanger 3 via the communication unit 41.

The battery management unit 53 manages the battery packs 2 that are being lent. For example, when starting the service, the serial numbers of the battery packs 2 are registered in the in-use battery list (new registration). Further, battery management unit 53 manages the linking information that associates each battery pack 2 that is lent out with the user. Each time the battery packs 2 are exchanged in the battery exchanger 3, the linking information is updated by using the returned/lent list received from the relevant battery exchanger 3. When the administrator performs an operation to terminate the use of a battery pack 2 of a certain registration number on the management terminal 6, the serial number entered from the management terminal 6 is registered in the excluded battery list.

The station information presentation unit 54 presents the information on the battery station to the user. For example, a station guide screen for guiding the user to the battery station is generated and forwarded to the user terminal 5 to be displayed on the user terminal 5. On this station guide screen, the position of the battery station and the number of available battery packs 2 at the battery station are shown.

The system management unit 55 monitors the status of the system, and presents the status of the system to the administrator or a maintenance person. For example, a management screen is generated and forwarded to the management terminal 6 or the maintenance terminal 7 to display the status of the system on the management terminal 6 or the maintenance terminal 7 so that the administrator or the maintenance person is enabled to view the status of the system. More specifically, information on the state of the battery exchanger placed in each battery station, the state of the battery packs 2 received in each battery exchanger 3, the state of the battery exchange operation performed by each battery exchanger 3, and the like is collected (information collection), and the collected state information is displayed on the management screen. Further, the items detected from the system state information are displayed on the management screen as an error (abnormality), an alert (warning), and a normal notification according to the degree of urgency.

The notification management unit 56 manages notifications (notices) to the users. More specifically, guidance on opening and closing of battery stations, maintenance information such as construction work to be performed at the battery stations, and guidance on the suspension of battery exchange reservations due to network failures or the likes are transmitted to the user terminals 5.

The reservation management unit 57 manages the battery exchange reservations by the users. More specifically, a battery exchange reservation is accepted when the user performs a prescribed reservation operation on the user terminal 5. In addition, a battery exchange reservation is canceled when the user performs a prescribed cancel operation on the user terminal 5. Also, if the battery exchange is not performed within a predetermined time period after accepting a battery exchange reservation, the battery exchange reservation is forcibly canceled.

Figure 3:
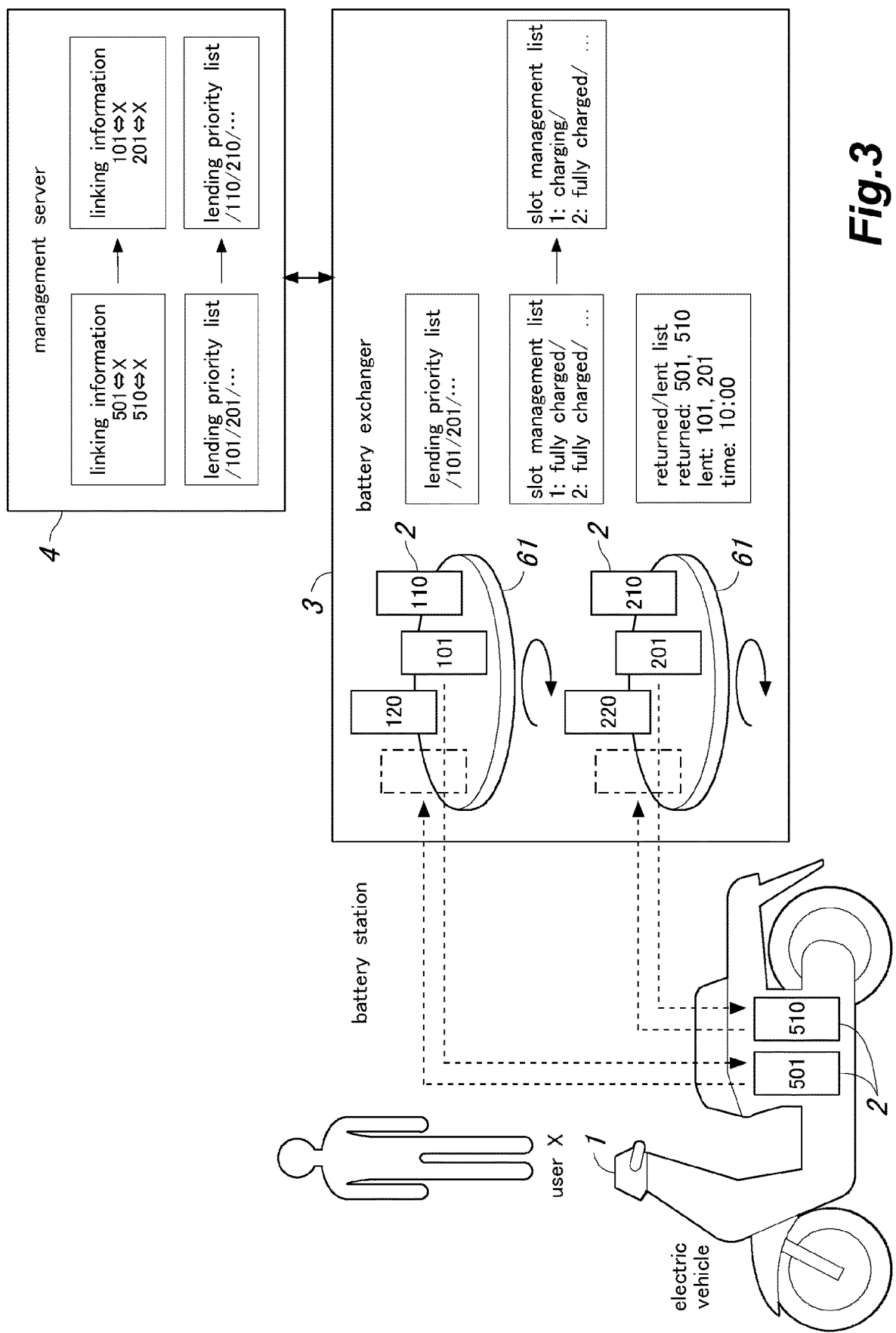
FIG. 3 is a schematic diagram illustrating a general mode of operation of the system in exchanging batteries.

The mode of operation of the system in exchanging battery packs 2 is described in the following. FIG. 3 is a schematic diagram illustrating a general mode of operation of the system in exchanging batteries. Each battery pack 2 is given a three-digit serial number in FIG. 3 for the convenience of description, but may be given, for instance, an eight-digit serial number in practice.

One or a plurality of battery packs 2 are mounted on the electric vehicle 1. In the case where a plurality of battery packs 2 are mounted, all of the battery packs 2 are simultaneously replaced.

In this embodiment, the battery exchanger 3 is configured to receive a plurality of battery packs 2. The battery exchanger 3 is provided with a plurality of turntables 61 (storing/dispensing mechanisms) each fitted with a plurality of slots (trays) each configured to hold one battery pack 2. In the example shown in FIG. 3, a pair of turntables 61 each having four slots are provided in two stages one above the other so that a total of eight battery packs 2 can be received.

In this battery exchanger 3, each turntable 61 has a vacant slot so that one returned battery pack 2 can be stored in each turntable 61. When two battery packs 2 are exchanged for new ones at the same time, each of the two turntables 61 receives a returned battery pack 2, and each of the two turntables 61 dispenses one battery pack 2. Thus, for example, when the number of the battery packs 2 mounted on the electric vehicle 1 is two, the two battery packs 2 can be simultaneously exchanged by constructing the battery exchanger 3 in two stages. In addition, one battery station may have a plurality (four, for instance) of battery exchangers. Thus, when four battery packs 2 are mounted on each electric vehicle 1, the four battery packs 2 mounted on the electric vehicles 1 can be replaced at the same time.

In the example shown in FIG. 3, the number of battery packs 2 mounted on the electric vehicle 1 is two, but the number may also be one or may also be three or more. Further, the turntable 61 is used as the battery exchanger 3 in this embodiment, but a locker type exchanger having a plurality of rechargeable battery receptacles arranged vertically and horizontally may also be used. Furthermore, it is also possible to arrange a plurality of receptacles either horizontally or vertically to store the battery packs, and receive and dispense the battery packs into and out of the receptacles by using a lift mechanism or the like.

When the battery packs 2 are exchanged at the battery exchanger 3, a returned/lent list (exchange information) is created, and transmitted to the management server 4. In this returned/lent list, the serial number of the returned battery pack 2, the serial number of the lent battery pack 2, and the time point of battery exchange (time stamp) are recorded.

The management server 4 manages the linking information that associates the lent battery packs 2 with the users who have lent the battery packs 2. Upon receiving the returned/lent list from the battery exchanger 3, the management server 4 updates the linking information (linking process) according to the returned/lent list. Owing to the employment of such a linking process, simply by registering the user information in association with the lent battery pack 2, the user information is maintained by the management server 4 by referring to the returned/lent list of the battery packs 2 so that the need for a complex operation such as authenticating the user every time the battery packs 2 are exchanged is eliminated, and the inconvenience to the user is significantly minimized.

Further, the battery exchanger 3 periodically updates a slot management list, and transmits the updated slot management list to the management server 4. In this slot management list, the charge state and the vacancy state of the battery pack 2 in each slot are indicated. As a result, the management server 4 can manage the charge state and the vacancy state of each battery pack 2 in the battery exchanger 3.

Further, the management server 4 generates a lending priority list (lending instruction information) indicating the battery packs 2 that have been fully charged in the battery exchanger 3 and are therefore available for lending out from the battery exchanger 3, and transmits the list to the battery exchanger 3.

Based on the lending priority list received from the management server 4, the battery exchanger 3 selects the battery packs 2 to be lent out, and dispense them. The lending priority list describes the order in which the battery packs 2 are preferentially lent out, and the battery packs 2 having the highest priority are lent out.

In addition, the management server 4 updates the lending priority list every time the battery packs 2 are exchanged according to the returned/lent list received from the battery exchanger 3, and transmits the updated returned/lent list to the battery exchanger 3.

In this conjunction, according to the present embodiment, the battery packs 2 are lent out according to the lending priority list, and the lending priority may be set in the order in which charging is completed. However, the lending order may also be set according to a prescribed policy on the utilization of the battery packs 2. For instance, the deterioration state of each battery pack 2 may be transmitted to the management server 4, and the lending order may be set in a descending order of deterioration levels. Thus, by preferentially lending out the battery packs 2 having higher deterioration levels, such battery packs 2 can be recovered in short periods of time to be replaced with new ones.

Figure 4:
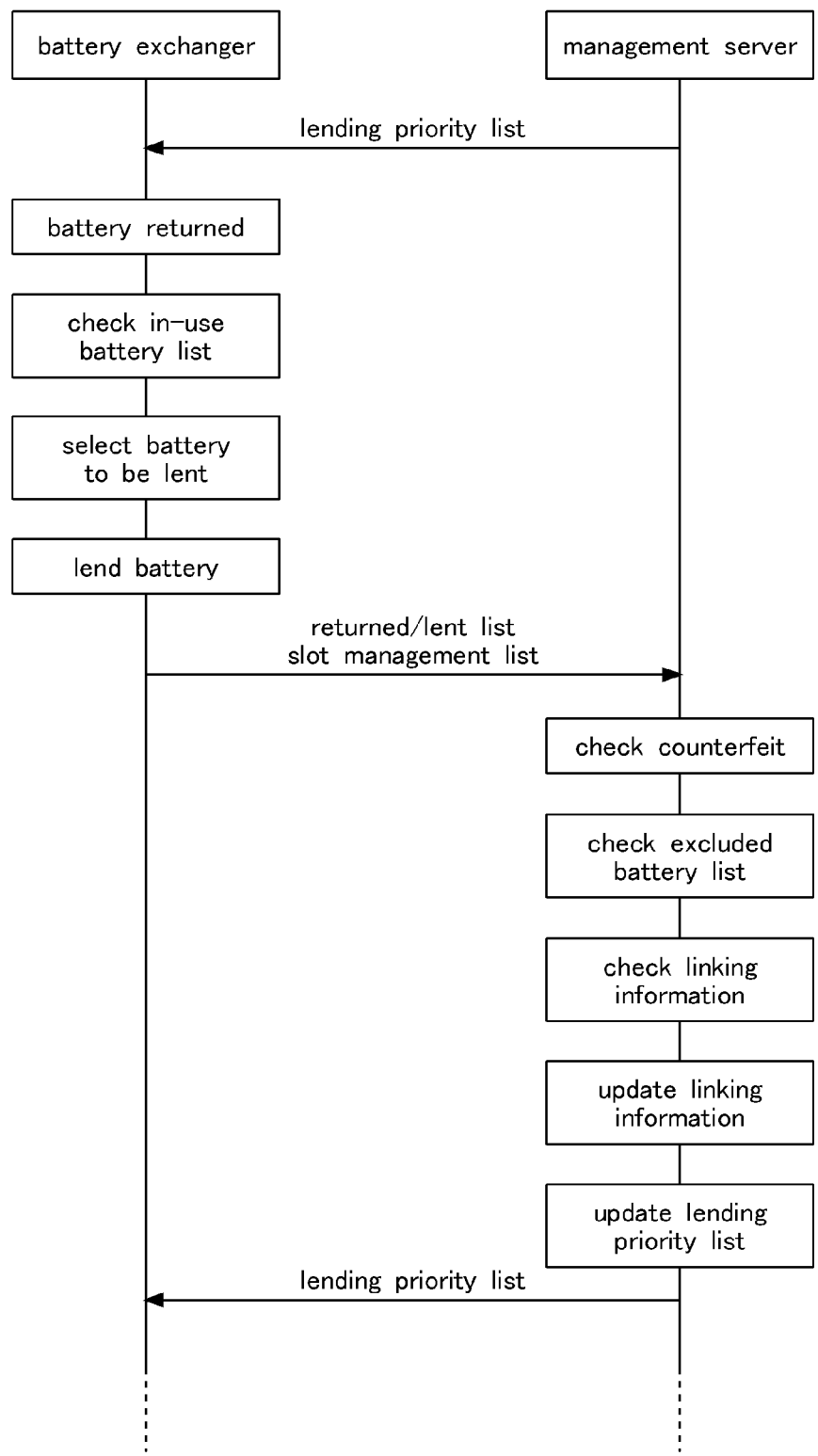
FIG. 4 is a sequence diagram showing an operating procedure of the system in exchanging batteries.

The operating procedure of the system in exchanging the battery packs is described in the following. FIG. 4 is a sequence diagram showing the operating procedure of the system in exchanging battery packs.

First of all, the management server 4 transmits to the battery exchanger 3 a lending priority list that defines the lending order of the battery packs 2.

In the battery exchanger 3, when the user returns a battery pack 2, it is determined if the returned battery pack 2 is a genuine product (the battery pack 2 that is covered by the battery exchange service) according to the in-use battery list. The in-use battery list is transmitted from the management server 4 to the battery exchanger 3 in advance.

Next, in the battery exchanger 3, the battery pack 2 to be lent is selected based on the lending priority list received from the management server 4, and the selected battery pack 2 is lent to the user.

Then, the battery exchanger 3 transmits the returned/lent list to the management server 4. This returned/lent list includes information (the serial number, etc.) on the returned battery pack 2 and the lent battery pack 2.

Upon receiving the returned battery pack 2, the management server 4 determines the possibility of the returned battery pack 2 being a counterfeit product by examining if the serial number of the returned battery pack 2 is unknown or is duplicated by referring to the in-use battery list. If the returned battery is suspected to be a counterfeit, an alert is issued.

The management server 4 then compares the serial number of the returned battery pack 2 with the excluded battery list, and determines if the returned battery pack 2 is not eligible for the battery exchange service. If the serial number matches with an entry in the excluded battery list, the battery pack 2 is excluded from the registration in the lending priority list. In such a case, an alert may be issued so that the excluded battery may be removed from the battery exchange service.

Thereafter, the management server 4 examines the linking information between the battery pack 2 and the ID of the user who has been lending the battery pack 2. More specifically, it is determined if there is the linking information for the battery pack 2 that is returned in the online state. Further, when a plurality of battery packs 2 are returned, it is also determined if the linking information of each and every battery pack 2 is linked to the same user ID.

The management server 4 then updates the linking information as a linking process. This linking process updates the linking information by assigning the user ID linked to the returned battery pack 2 in the online state to the newly lent battery pack 2.

Next, the management server 4 updates the lending priority list. At this time, among the battery packs 2 stored in the battery exchanger 3, those battery packs 2 that are fully charged are assigned with a lending priority order based on a prescribed rule. The updated lending priority list is transmitted to the battery exchanger 3.

Figure 5:
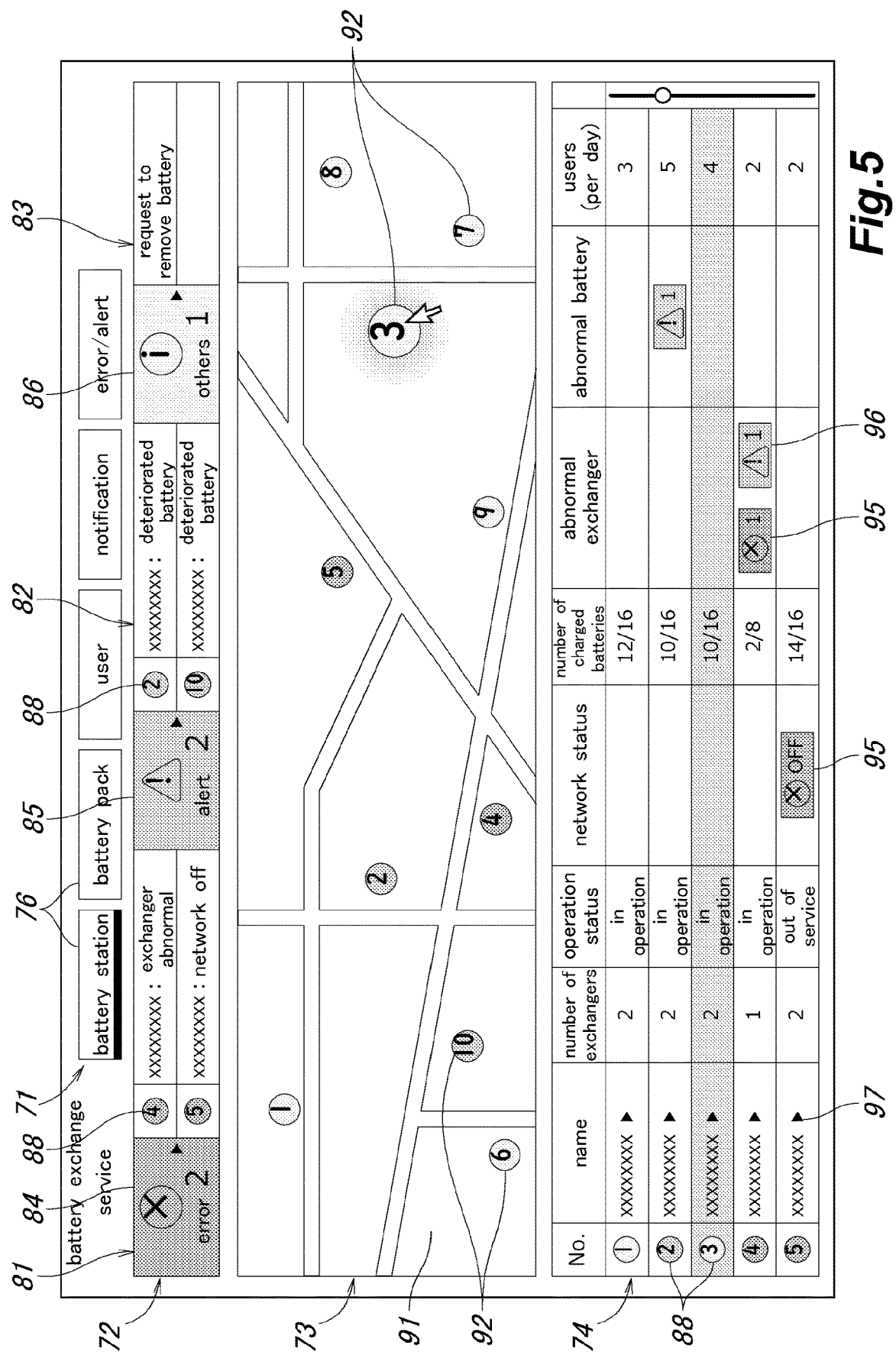
FIG. 5 is an explanatory view of a station information main screen that may be displayed on a management terminal 6.

Next, a station information main screen displayed on the management terminal 6 is described in the following. FIG. 5 is an explanatory view of the station information main screen that may be displayed on the management terminal 6.

In this embodiment, a station information main screen is displayed on the management terminal 6 as a management screen. This station information main screen is a top screen that is displayed first when the management terminal 6 accesses the management server 4 to log in.

This station information main screen includes a menu selection section 71, a summary display section 72, a map display section 73, and a list display section 74.

The menu selection section 71 is provided with a plurality of tabs 76 representing different menus. In the example shown in FIG. 5, the tabs 76 includes a battery station tab, a battery pack tab, a user tab, a notification tab, and an error/alert tab.

When the battery station tab 76 is operated, this station information main screen is displayed.

When the battery pack tab 76 is operated, the screen changes to a battery pack list screen (not shown in the drawings). The battery pack list screen shows information on the battery packs 2 in service, such as the serial numbers of the battery packs 2, and information on the locations of the battery packs 2 (in use by a user, or in a battery exchanger 3 for storage).

When the user tab 76 is operated, the screen changes to a user list screen (not shown in the drawings). In the user list screen, information about the registered users, such as user IDs, names, ages, sex, IDs of electric vehicles in use, information about battery packs 2 in use (battery pack IDs, etc.), and the registration dates, is displayed.

When the notification tab 76 is operated, the screen changes to a notification list screen (not shown in the drawings). On this notification list screen, history information about notifications that were transmitted in the past, such as the notification dates/time points, notification contents, and the like, is displayed. Also, the notification list screen can be changed to a notification registration screen. On this notice registration screen, new notices can be registered. Specifically, the titles, the display periods, and the contents of the notifications may be entered as a registration operation.

When the error/alert tab 76 is operated, the screen changes to an error/alert list screen (not shown in the drawings). On this error/alert list screen, history information regarding errors and alerts that have been output in the past, such as the output dates/time points and the output contents, is displayed.

Additional tabs such as a tab (history search tab) that allows the history on the use of the system by users and the history of the operation state of the system to be searched, and a tab (maintenance setting tab) that allows the administrator to select a threshold for determining a timing for demanding maintenance work such as component part replacement may also be provided.

The summary display section 72 includes an error display field 81, an alert display field 82, and a normal notification display field 83. In this case, an error (abnormal) means a notification item that needs to be dealt with urgently, an alert (warning) means a notification item that requires a lower urgency but needs to be dealt with as early as possible, and a normal notification means a notification item other than an error or alert.

An error icon 84 is displayed in the error display field 81. The error icon 84 displays the number of currently occurring errors. Further, the error display field 81 displays an icon 88 of the battery station at which the error has occurred, the name of the battery station at which the error has occurred, and the content of the error.

An alert icon 85 is displayed in the alert display field 82. In the alert icon 85, the number of alerts currently occurring is displayed. Further, the alert display field 82 displays an icon 88 of the battery station at which the alert has occurred, the name of the battery station at which the alert has occurred, and the content of the alert.

A normal notification icon 86 is displayed in the normal notification display field 83. The normal notification icon 86 displays the number of normal notifications that are currently occurring. Further, the content of the normal notification is displayed on the normal notification display field 83.

The error icon 84, the alert icon 85, and the normal notification icon 86 are displayed in different colors according to the degree of urgency. For example, the error icon 84 is displayed in red, the alert icon 85 is displayed in orange, and the normal notification icon 86 is displayed in blue. The error icon 84, the alert icon 85, and the normal notification icon 86 are displayed in gray when no error, alert, or normal notification has occurred.

In the map display section 73, an area map 91 is displayed, and a battery station icon 92 is superimposed on the area map 91 at a position corresponding to each battery station on the area map 91.

The corresponding battery station number is displayed on each battery station icon 92. The battery station icons 92 are displayed in colors corresponding to the different states of the battery stations. For example, the color of the icon may be red if there is an error, orange if there is an alert, green if there is no error or alert, and the battery station is operating normally, and gray if the battery station is out of service.

The list display section 74 displays a battery station list (list) detailing state information of each battery station. The battery station list includes entries or fields for the serial numbers of the battery stations, and the names of the battery stations, and, for each of the battery stations, the number of battery exchangers 3, the operating state, the network status, the number of charged battery packs 2 (the number of charged battery packs 2), presence of any abnormal battery exchangers 3 and abnormal battery packs 2, and the number of users are displayed.

In the battery station serial number field, the battery station icon 88 is displayed. In the network status display field, when there is an error or alert related to the network status, an error icon 95 and an alert icon 96 are displayed. Further, in the battery exchanger abnormality display field, an error icon 95 or an alert icon 96 is displayed when there is an error or an alert regarding the battery exchanger 3. Further, in the battery pack abnormality display field, when there is an error or an alert regarding the battery pack 2, an error icon 95 or an alert icon 96 is displayed. In the battery exchanger abnormal display field and the battery pack abnormal display field, the number of battery exchangers 3 having an error or alert, and the number of battery packs 2 having an error or alert are displayed on an error icon 95 or an alert icon 96.

When the battery station icon 92 is operated in the map display section 73, the battery station icon 88 is highlighted (for example, enlarged), and the corresponding battery station display field on the list display section 74 is highlighted (emphasized), for instance, by changing the background color or by video reversing.

Further, the list display section 74 is provided with an icon 97 in the battery station name field thereof. When this icon 97 is operated, the screen changes to the station information detail screen (see FIG. 6).

The battery station icon 88 displayed on the summary display section 72 or the list display section 74 corresponds to the battery station icon 92 displayed on the map display section 73, and indicates the station serial number. The battery station icon 88 may be displayed in the same color as the battery station icon 92.

As described above, in the station information main screen, the summary display section 72 displays summary state information, the list display section 74 displays detailed state information, and the map display section 73 displays intermediate state information. By arranging the summary display section 72, the map display section 73, and the list display section 74 in this order from the upper side to the lower side of the screen, the state information is displayed from the upper side to the lower side of the screen in a progressively more detailed fashion. Further, in the summary display section 72 of the station information main screen, by arranging the error display field 81, the alert display field 82, and the normal notification display field 83 in this order from the left side to the right side of the screen, the state information is displayed from the left side to the right side of the screen in the order of importance (priority, urgency). Thereby, the administrator is enabled to monitor the state of each battery station in an efficient manner.

Further, on the station information main screen, the error icon 84, the alert icon 85 and the normal notification icon 86 are displayed in different colors according to the degree of urgency, and the battery station icons 88 and 92 are also displayed in different colors according to the degree of urgency in a similar manner.

Figure 6:
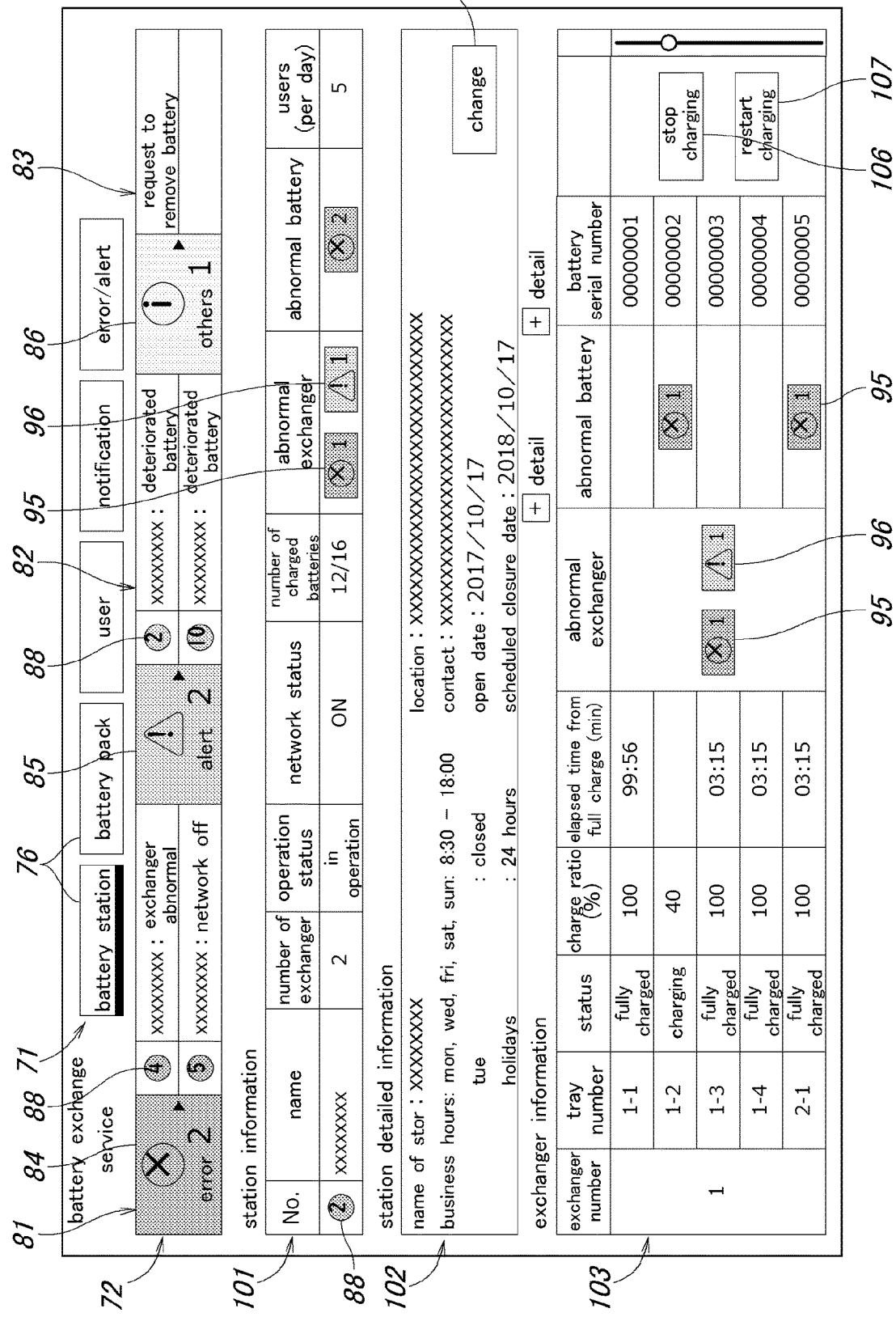
FIG. 6 is an explanatory view of a station information detail screen that may be displayed on the management terminal 6.

Next, the station information detail screen displayed on the management terminal 6 is described in the following. FIG. 6 is an explanatory view of the station information detail screen.

In this embodiment, the station information detail screen is displayed on the management terminal 6 as a management screen. This station information detailed screen is displayed by performing an operation of selecting a battery station on the station information main screen (see FIG. 5).

The station information detail screen is provided with a menu selection section 71, a summary display section 72, a station information display section 101, a station detailed information display section 102, and a battery exchanger information display section 103.

The menu selection section 71 and the summary display section 72 are the same as those on the station information main screen (see FIG. 5).

In the station information display section 101 is displayed information on the selected battery station. More specifically, the station information display section 101 displays the serial number of the battery station, the name of the battery station, the number of battery exchangers 3 installed therein, the operating status, the network status, the number of charged battery packs 2, any abnormality of the battery exchangers 3, any abnormality of the battery packs 2, and the number of users. This is similar to the list display section 74 of the station information main screen (see FIG. 5).

The station detailed information display section 102 displays detailed information of the selected battery station. More specifically, the station detailed information display section 102 displays the name of the store where the battery station is installed, and the business hours, the location, the contact information, the opening date, and the scheduled closing date of the store. Further, a change button 105 is provided, and by operating this button 105, an edit screen (not shown in the drawings) for changing or editing the detailed information of the battery station is displayed.

The battery exchanger information display section 103 displays a list of information on the battery exchangers 3 provided in the selected battery station. This list includes the serial numbers of the battery exchangers 3, the serial numbers of the trays provided in each battery exchanger 3, and the serial numbers of the battery packs 2. The list further includes the charge state, the charging ratio (%), and the elapsed time after the completion of charging (min) of the battery pack 2 in each tray, as well as any abnormality of the battery exchangers 3, and any abnormality of the battery packs 2. Although not shown in the drawings, a field for a charging stop state may also be provided.

Similarly as in the station information main screen (see FIG. 5), an error icon 95 and an alert icon 96 may be displayed in the abnormality display fields for the battery exchangers 3 and the battery pack 2s.

The battery exchanger information display section 103 includes a charge stop button 106 and a charge restart button 107. By operating the charge stop button 106, the charging of the battery pack 2 can be stopped. Further, by operating the charge restart button 107, the charging of the battery pack 2 can be restarted. As a result, an administrator or a maintenance person can control the charging operation of the battery pack 2 at the battery exchanger 3.

The present invention has been described in terms of a specific embodiment, but is not limited by such an embodiment, and can be modified, substituted, added and omitted in other embodiments. Also, a new embodiment may be created by combining various components of the foregoing embodiment.

INDUSTRIAL APPLICABILITY

The battery station management system and the battery station management method according to the present invention provide various advantages by allowing the management operation and the maintenance operation to be performed in such a manner that the states of all of the battery stations located in different locations can be monitored in an efficient manner, and the states of the battery stations can be kept in proper order. Therefore, the battery station management system and the battery station management method of the present invention are highly beneficial when used in battery exchange services whereby users of electric vehicles or the like exchange battery devices at battery stations.

GLOSSARY OF TERMS

1 electric vehicle
2 battery pack (battery device)
3 battery exchanger (battery exchange device)
4 management server (server device)
5 user terminal (terminal device)
6 management terminal
7 maintenance terminal
31 sensor
32 drive unit
33 charging unit
34 communication unit
35 input/output unit
36 display unit
37 storage unit
38 control unit
41 communication unit
42 storage unit
43 control unit
88, 92 battery station icon

The invention claimed is:

1. A battery station management system for managing battery stations, the battery station management system comprising:
a plurality of battery exchange devices each provided in a battery station to receive and recharge battery devices returned by users, and lend out recharged battery devices in exchange for returned battery devices; and
a server device connected to the battery exchange devices via a network to manage a status of exchanging battery devices at each battery exchange device;
wherein the server device is configured
to collect state information on a state of the battery exchange devices, and on a state of the battery devices received in the battery exchange devices, and
to generate a monitoring screen based on the state information, the monitoring screen containing a map display section displaying an area map showing icons respectively indicating the battery stations, and a state display section displaying the state of the battery exchange devices and the state of the battery devices received in the battery exchange devices.

2. The battery station management according to claim 1, wherein the monitoring screen contains a plurality of display fields displaying the state information and arranged so as to correspond to an importance level or detail level of the state information.

3. The battery station management system according to claim 1, wherein the monitoring screen contains the state information displayed in colors corresponding to urgency levels of the state information.

4. The battery station management system according to claim 1, wherein the monitoring screen contains a status of battery devices that are available for lending out at each battery station.

5. The battery station management system according to claim 1, wherein the server device is further configured
to display a battery station list detailing the state information for each battery station on the monitoring screen,
to display an icon at a position corresponding to each battery station on the area map displayed on the monitoring screen, and
in response to an operation on the icon of a corresponding battery station, to highlight an entry of the corresponding battery station in the battery station list.

6. The battery station management system according to claim 1, wherein the state display section includes a battery station list field that displays the battery stations as a list.

7. The battery station management system according to claim 1, wherein the state display section includes a priority display field for preferentially displaying only one or more of the battery stations where an error or an alert occurs among the battery stations.

8. The battery station management system according to claim 1, wherein the state display section includes a battery exchange device list field that displays a list of the battery exchange devices installed at a selected one of the battery stations.

9. The battery station management system according to claim 1, wherein the state display section includes a battery device list field that displays the battery devices located in a selected one of the battery stations as a list.

10. The battery station management system according to claim 1, wherein the state display section includes a notification display field that displays at least one of an error or an alert of the battery exchange devices and the battery devices received in the battery exchange devices.

11. The battery station management system according to claim 1, wherein the monitoring screen contains a stop instruction part that accepts instructions to stop charging a selected one of the battery exchange devices.

12. The battery station management system according to claim 11, wherein the state display section includes a battery exchange device list field that displays the battery exchange devices located in a selected one of the battery stations as a list, and the stop instruction part is located in the battery exchange device list field.

13. The battery station management system as defined in claim 1, wherein the monitoring screen includes icons in the state display section respectively corresponding to the icons displayed on the map display section.

14. A battery station management method for managing battery stations at which users exchange battery devices in a server device, the battery station management method comprising:
  collecting state information on a state of battery exchange devices, and on a state of battery devices received in the battery exchange devices, each of the battery exchange devices provided in one of the battery stations to receive and recharge battery devices returned by users and to lend out recharged battery devices in exchange for returned battery devices, and
  generating a monitoring screen based on the state information, the monitoring screen containing a map display section displaying an area map showing icons respectively indicating the battery stations, and a state display section displaying the state of the battery exchange devices and the state of the battery devices received in the battery exchange devices.

* * * * *